No. 673,327. Patented Apr. 30, 1901.
B. REEVE.
PORTABLE HOUSE.
(Application filed Sept. 4, 1900.)
(No Model.) 2 Sheets—Sheet 1.

WITNESSES
INVENTOR
BUDD REEVE
BY Paul & Hawley
HIS ATTORNEYS

No. 673,327. Patented Apr. 30, 1901.
B. REEVE.
PORTABLE HOUSE.
(Application filed Sept. 4, 1900.)

(No Model.) 2 Sheets—Sheet 2.

WITNESSES.
E. G. Staude
M. C. Noonan

INVENTOR
BUDD REEVE
BY Paul & Hawley
HIS ATTORNEYS

THE NORRIS PETERS CO., PHOTO-LITHO., WASHINGTON, D. C.

UNITED STATES PATENT OFFICE.

BUDD REEVE, OF BUXTON, NORTH DAKOTA.

PORTABLE HOUSE.

SPECIFICATION forming part of Letters Patent No. 673,327, dated April 30, 1901.

Application filed September 4, 1900. Serial No. 28,886. (No model.)

*To all whom it may concern:*

Be it known that I, BUDD REEVE, of Buxton, county of Traill, State of North Dakota, have invented certain new and useful Improvements in Portable Houses, of which the following is a specification.

The invention relates to portable houses of the "knockdown" type that are adapted particularly for use as storehouses or granaries. It has been customary in farming communities where the grain-fields were located at a distance from the home farm and storehouse to provide portable granaries or temporary storehouses which were hauled out to the field during the threshing season and filled with grain and allowed to stand in the field until the farmer was ready to market the grain or store it in his general or permanent granary. These portable granaries were usually dragged over the ground from place to place, and though heavily and strongly built required frequent repairs. Furthermore, a considerable amount of time and labor were necessary to move them from the home farm to a distant grain-field and back again.

The primary object, therefore, of my invention is to provide a granary that can be hauled to the grain-field in knockdown form and easily and quickly set up near the separator to receive the grain as it is threshed and as readily taken apart and transported to another field or back to the home farm for storage until another season.

A further object is to provide a building of extremely strong and durable construction and one that is able to withstand the extreme lateral pressure of the grain stored therein.

A further object is to provide a building that may with a few modifications be used as a dwelling.

The invention consists generally in various constructions and combinations, all as hereinafter described, and particularly pointed out in the claims.

Figure 1:
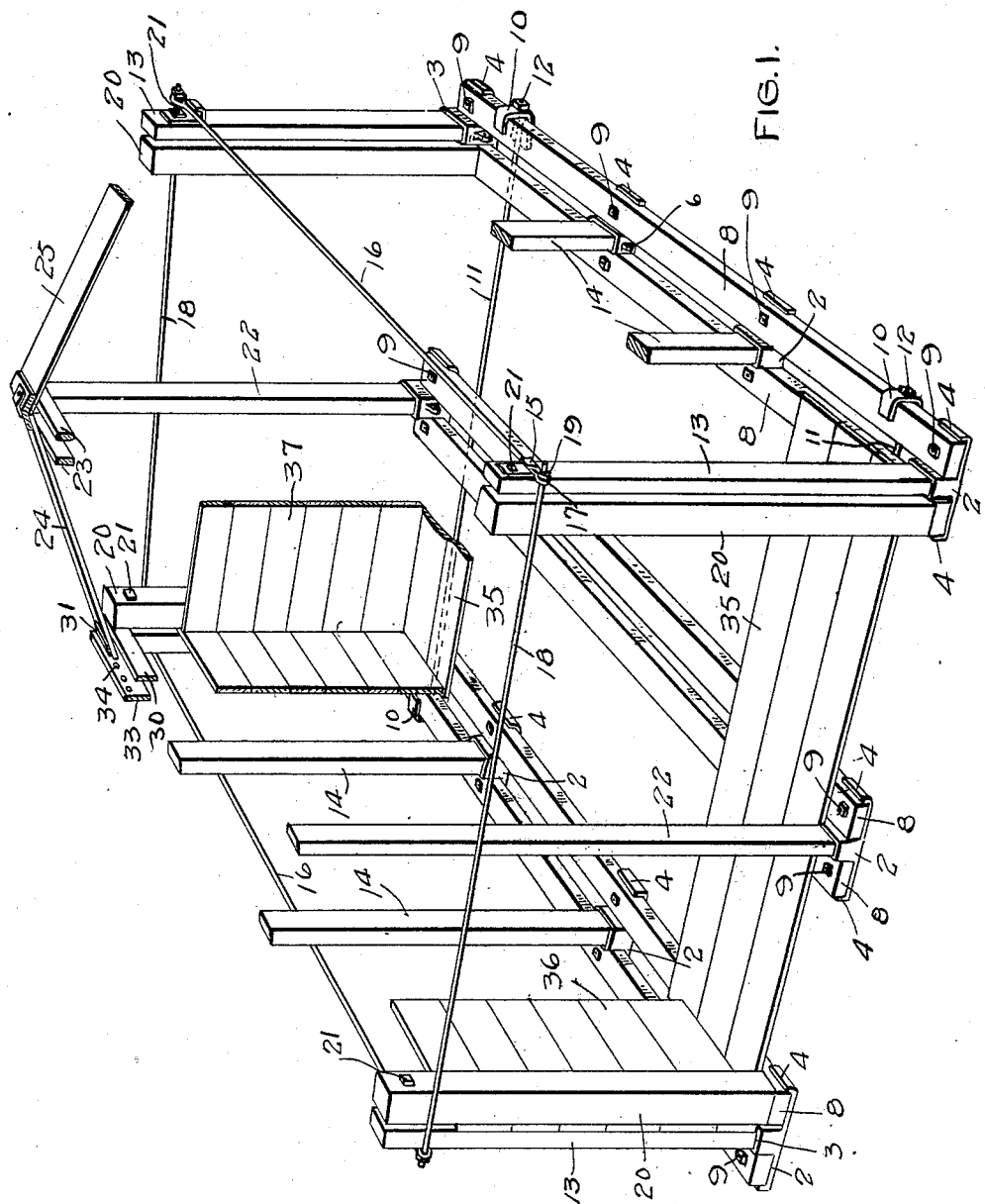
Figure 2:
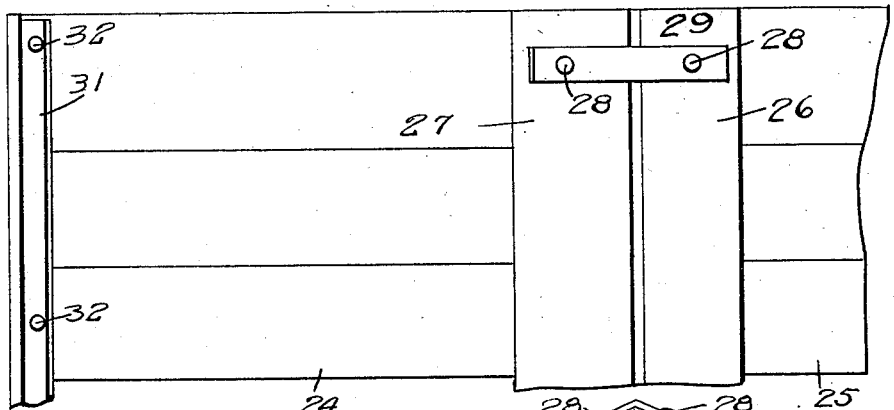
Figure 3:
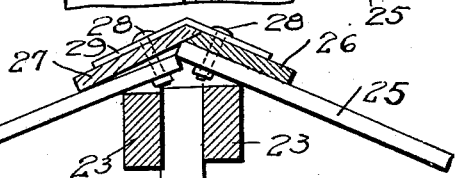
Figure 3:
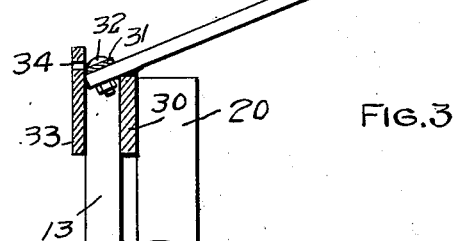
Figure 6:
Figure 5:
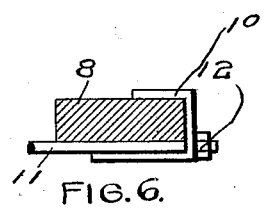
Figure 4:
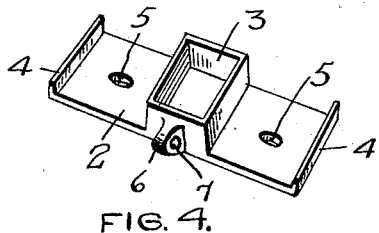

In the accompanying drawings, forming part of this specification, Figure 1 is a perspective of a portable granary or storehouse embodying my invention. Fig. 2 is a plan view of a portion of the roof. Fig. 3 is a vertical section of the same. Fig. 4 is a perspective of the base whereon the sills of the building are secured. Fig. 5 is a perspective showing a modified means for securing the sills to the base and to each other. Fig. 6 is a sectional view showing the manner of connecting the outside sills of the building together.

In the drawings, 2 represents a base-plate, preferably cast, having a centrally-arranged socket 3 and end lips or flanges 4. The plate 2 is also preferably provided with holes 5 and a lug 6, having an eye 7. I prefer to provide one of these base-plates at each corner of the building and at points intermediate thereto to support the sills of the building and prevent them from working or slipping out of their proper position. I prefer to provide sills 8, of two-by-four dimensions, and these sills are arranged in pairs flatwise upon the plates 2, between the sockets therein and the flanged ends. The sills preferably fill the space between the walls of each socket and the flanges or lips 4 and are secured on the seat or bed therein by bolts 9, passing through the holes 5. The sills upon each side of the building are secured to the base-plate in a similar manner, and the base of the building is prevented from spreading by hooks 10, which engage the outer sills upon each side of the building and are connected by rods 11, having nuts 12 to permit the strain on the rod to be increased or decreased at will. Between the pairs of sills I provide the upright timbers or studs 13, fitting into the sockets between the sills at the corners of the building, and the studs 14, that are supported by the sockets in the base-plates arranged intermediate to the corners of the building. The studs 13 are provided with brackets 15, wherein rods 16, having loops or eyes 17, are supported. These rods 16 extend along the sides of the building and are connected at their ends by rods 18, that enter the eyes 17 and are adjustable therein by means of the nuts 19. The rods 18 are provided at each end of the building and with the rods 16 form a continuous rectangular band or belt around the upper portion of the building-walls and prevent them from spreading under the pressure of the grain therein. At each corner of the building, upon the ends of the inner sills, I prefer to arrange a post 20, substantially four-by-four dimensions and spaced from the studs 13 a sufficient distance to permit the insertion between them of the ends of the boards forming the side walls of the granary or storehouse.

I prefer to connect the studs 13 and the posts 20 by bolts 21 to prevent them from spreading, and the lower ends of the posts 20 are prevented from moving away from the studs by the ends of the bolts 9 fitting within sockets or recesses in the ends of the posts. Between the side sills of the building I prefer to provide an intermediate pair corresponding to those on the sides and secured to base-plates in a similar manner. These intermediate sills are preferably arranged beneath the center or ridge-pole of the building, and their base-plates support the studs 22, which correspond to those heretofore described, except that they are longer and are adapted to support the ridge-pole of the building. These studs 22 are arranged, preferably, at the ends of the sills beneath the ridge-pole and are connected by parallel horizontal bars 23, whereon the inner ends of the roof-boards 24 and 25 are supported. As shown in Fig. 3, the inner ends of the boards 25 overlap slightly the corresponding ends of the boards 24, and upon these overlapping ends I arrange the ridge-pole plates 26 and 27, which break joints with the ends of the boards 24 and 25 and are secured thereon and to each other by bolts 28, passing through angle-plates 29. This arrangement of the ridge-pole plates or boards with respect to the roof-boards forms a water-tight joint and prevents rain from leaking through the roof into the granary. The outer ends of the roof-boards 24 and 25 are supported upon narrow slats or bars 30, provided between the studs 13 and the posts 20, and rest upon the bolts 21.

I prefer to connect the outer ends of the roof-boards upon each side of the roof by narrow slats 31, secured to the roof by bolts 32, and to prevent any longitudinal movement of the roof-boards I prefer to provide boards 33 at the top of the studs 13, projecting above the edges of the roof and provided with a series of perforations 34 to permit the escape of water thereon.

In the construction of the building as heretofore described no nails or screws have been used. The sills have been secured to the base-plates and the studs and posts arranged in their upright positions on the sills by the employment of bolts and rods that can be easily disconnected or taken apart and the timbers packed away or transported to another field. The floor-boards 35 are arranged to overlap the inner sills of the side pairs, and the boards 36, forming the walls of the building, rest upon the overlapping ends of the floor-boards and have their ends inserted into the spaces between the studs 13 and the posts 20. These boards 36 may be easily inserted between the studs 13 and posts 20 and as readily removed, and the lower boards resting upon the floor-boards 35 form a close joint therewith and prevent leakage of the grain. In setting up the house the floor-boards are of course laid first, and then the side boards are placed in position, and the end boards 37 are then put in as fast as the granary fills up with grain and are held up against the posts 20 by the pressure of the grain. The gable ends of the roof may be filled in by removable boards or any other suitable means or may be left open entirely for ventilating purposes. In Fig. 5 I have shown a slight modification in the manner of securing the two-by-four sills to the base-plates. This modification consists in placing the sills on edge, bearing against the walls of the sockets and connected by bolts 38 passing through the holes 7 in the lugs 6.

If preferred, I may dispense with the board roof and use a canvas covering to protect the contents of the granary from the weather. As the base-plates and sills will not be taken apart after being once secured together, it will only be necessary in taking down the granary for the operator to loosen the rods connecting the sides of the building, take out the side and floor boards, and remove the upright studs and posts from their sockets. The building will then be in knockdown form ready for transportation to another field or to a place of storage. The building when in knockdown form can be packed away in a small space and the boards and timbers protected from the weather and used from year to year for an indefinite period, while a building put together with nails would ordinarily be exposed to the weather and require repairs every season. It will be understood that with a few modifications the structure may be adapted for a dwelling, particularly a summer cottage, it being necessary simply to provide openings at intervals in the side walls for doors and windows. When provision is made for doors and windows, the structure becomes capable of a variety of uses, such as a cabin for hunters, prospectors, or campers who are usually temporarily located in one place and find it necessary to build a cabin or camp at each halting-point. To such parties a building of this character would be especially valuable, as it can be easily transported with the other camp equipments, quickly set up at each camping-place, and as easily taken down for removal.

Having thus described my invention, I claim as new and desire to secure by Letters Patent—

1. The combination, in a knockdown granary, with the pairs of parallel side sills, of base-plates whereon said sills are secured, sockets provided on said base-plates between the sills of each pair, and upright studs fitting within said sockets, substantially as described.

2. The combination, in a knockdown granary, with a pair of parallel side sills, of base-plates arranged at intervals beneath said sills and whereto said sills are secured, sockets provided on said base-plates between said sills, vertical studs provided in said sockets, and upright posts provided at each end of the inner sill of the pair and supported thereon and the base-plate beneath and spaced from the adjacent stud, and means for securing said posts and studs together, substantially as described.

3. The combination, with the granary-sills arranged in pairs, of base-plates provided beneath the pairs of sills and secured thereto, sockets provided on said base-plates between the sills of each pair, vertical studs fitting therein, means preventing the spreading and separation of the pairs of sills, upright posts provided at the ends of the inner sills of each pair over the corner base-plates and spaced from the studs at that point, means connecting the adjacent posts and studs, and means connecting the posts and studs from corner to corner of the building, substantially as described.

4. The combination, in a knockdown granary, with the sills, of the base-plates secured thereto, the vertical corner-studs, the upright posts provided near said studs and secured thereto, spaces being provided between said posts and studs, side boards having their ends inserted into said spaces, and the floor-boards resting upon said sills and supporting said side boards, substantially as described.

5. The combination, in a knockdown granary, with the sills, of the base-plates whereon said sills are secured, the sockets provided in said base-plates, the vertical corner-studs provided in said sockets, the side rods 16 connecting said studs at the side of the building, and the end rods 18 connecting said side rods, substantially as described.

6. The combination, in a knockdown granary, with the sills, of the base-plates provided at intervals beneath the same and whereon said sills are secured, hooks 10 provided near the ends of said sills upon opposite sides of the building, rods connecting the opposite hooks, corner-studs 13 mounted on said base-plates, brackets 15 provided on said studs, the rods 16 supported in said brackets and the end rods 18 connecting said rods 16, substantially as described.

7. The combination, with the parallel sills arranged in pairs upon each side of the building, of base-plates provided at intervals beneath said sills whereon said sills are secured, the sockets provided on said base-plates between said sills, the vertical studs arranged in said sockets, rods connecting said studs, sills and base-plates provided intermediate to said side sills, vertical roof-studs supported on said intermediate sills, and roofing-boards supported on said roof-studs, substantially as described.

8. The combination, in a knockdown granary, with the sills and base-plates, of the studs removably arranged upon said plates, the stay-rods connecting said studs, the sills and base-plates intermediate to said side sills, the studs thereon, the roofing-boards supported on said intermediate studs, plates provided at the outer ends of said roofing-boards and supporting the same, and the horizontal perforated boards provided on the vertical side studs and projecting above said roofing-boards, substantially as described.

9. The combination, in a knockdown building, with the sills arranged in pairs at the sides of the building, of the base-plates whereon said sills are supported, sockets provided in said base-plates between the sills of each pair, vertical studs fitting within said sockets, upright posts provided at the ends of the sills and spaced from the corner-studs, floor-boards adapted to rest upon said sills, side boards supported on said floor-boards and having their ends removably inserted between said posts and said corner-studs, and end boards provided between the opposite side boards and adapted to be held against said upright posts by the pressure of the contents of the building, substantially as described.

10. A portable granary, comprising side sills arranged in pairs, base-plates whereon said sills are secured, said base-plates having sockets between the sills of each pair, vertical studs removably arranged in said sockets, stay-rods connecting the corner-studs, upright posts provided on said sills and spaced from said corner-studs, removable floor-boards resting upon said sills, side boards supported on said floor-boards and having their ends removably inserted into the spaces between said posts and said studs, and a suitable roof or covering provided over the space thereby inclosed, substantially as described.

In witness whereof I have hereunto set my hand this 29th day of August, 1900.

BUDD REEVE.

In presence of—
RICHARD PAUL,
M. C. NOONAN.